(12) United States Patent
Forbes et al.

(10) Patent No.: US 6,408,979 B1
(45) Date of Patent: Jun. 25, 2002

(54) NOISE ABATEMENT FILTER FOR FUEL TANKS

(76) Inventors: Larry D. Forbes, 5017 Twana Dr., Des Moines, IA (US) 50310; Timothy B. Brandt, 1604 S. 42nd St., West Des Moines, IA (US) 50265; Brian S. Wood, 501 SW. Bell Ave., Des Moines, IA (US) 50315

( * ) Notice: Subject to any disclaimer, the term of this patent is extended or adjusted under 35 U.S.C. 154(b) by 0 days.

(21) Appl. No.: 09/525,365

(22) Filed: Mar. 15, 2000

(51) Int. Cl.[7] .......................... G10K 11/00; B65D 25/00
(52) U.S. Cl. ........................................ 181/198; 220/563
(58) Field of Search .......................... 181/200, 198, 181/202, 204, 207, 208; 220/563, 501; 244/135 B, 135 C; 137/574, 576, 582

(56) References Cited

U.S. PATENT DOCUMENTS 4,974,743 A * 12/1990 Sasaki et al. ............... 220/501
5,031,795 A * 7/1991 Kotera et al. ............... 220/563

OTHER PUBLICATIONS

6–Page brochure entitled Technical Products Function Sheet—Foamex—by Technical Products Group, undated.
4 sheets (copy) copied from a web site. by Johns Manville—EOM Insulations—Microlite®—Thermal and Acoustical Insulation, Dec. 1997.

* cited by examiner

*Primary Examiner*—Khanh Dang
(74) *Attorney, Agent, or Firm*—Henderson & Sturm LLP

(57) ABSTRACT

A fuel tank with a baffle disposed therein is disposed at an intermediate place between the two ends of the tank is provided for preventing noise caused when fuel shifts in the fuel tank from one end to the other. In a preferred embodiment, the baffle is constructed of a fiberglass filter media material. Also in a preferred embodiment, the baffle is collapsible so that it can be inserted into an opening in the top of a plastic fuel tank and then allowed to return to its original larger height whereby it will be held by a biasing pressure in a desired position within the tank.

11 Claims, 6 Drawing Sheets

NOISE ABATEMENT FILTER FOR FUEL TANKS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to baffles for fuel tanks and more particularly to a noise abatement baffle to prevent noise caused by shifting of fuel within a fuel tank.

2. Description of the Related Art

Modern-day cars have plastic fuel tanks designed to fit around other components on the underside of a vehicle. Often these tanks are longer from the front part of the vehicle to the back than the tanks are wide. During stopping and starting of the vehicle, noise is often generated as the fuel shifts forwardly and rearwardly.

Baffles to stop fuel shifting are known devices. To put a baffle in a steel fuel tank, the bottom half of the fuel tank can have a baffle installed in it before it is welded to the top half thereof. But many modern fuel tanks are blow molded from a plastic material. It is difficult, if not impossible, to blow mold baffles into a plastic fuel tank. So there is a problem of how to install a baffle into a plastic fuel tank.

There is also a dilemma presented by the fact that a regular baffle comprising a wall with holes in it apparently does not completely solve the noise problem in a plastic fuel tank. Placing a semi-rigid foam baffle in the tank that permits flow therethrough has been determined to be difficult to install and to hold in position. Airplane tanks and race car tanks, for example, have used a polyurethane safety foam which fills the entire tank for the purpose of preventing fuel movement and for other purposes. Filling the entire tank with a polyurethane safety foam, however, has not been deemed to be practical for most passenger and commercial vehicles.

Accordingly, there is a need for a noise abatement filter for vehicle tanks which would overcome the aforementioned problems.

BRIEF SUMMARY OF THE INVENTION

The present invention relates generally to a fuel tank with a baffle disposed therein at an intermediate place between the two ends thereof for preventing noise caused when fuel shifts in the fuel tank from one end to the other. In a preferred embodiment, the baffle is constructed of a fiberglass filter media material. Also in a preferred embodiment, the baffle is collapsible so that it can be inserted into an opening in the top of a plastic fuel tank and then allowed to return to its original larger height after it is in the tank whereby it will be held by a biasing pressure in a desired position within the tank.

An object of the present invention is to provide a noise abatement filter for fuel tanks.

Another object of the present invention is to provide a noise abatement filter which uses a fiberglass filter medium.

A still further object of the present invention is to provide a noise abatement filter which includes a baffle structure which is collapsible so that it will fit into an opening in the top of a fuel tank and then, once in proper position within the tank, will return to its expanded position and be held in a desired position within the tank.

Other objects, advantages, and novel features of the present invention will become apparent from the following detailed description of the invention when considered in conjunction with the accompanying drawings.

DETAILED DESCRIPTION OF THE INVENTION

Figure 1:
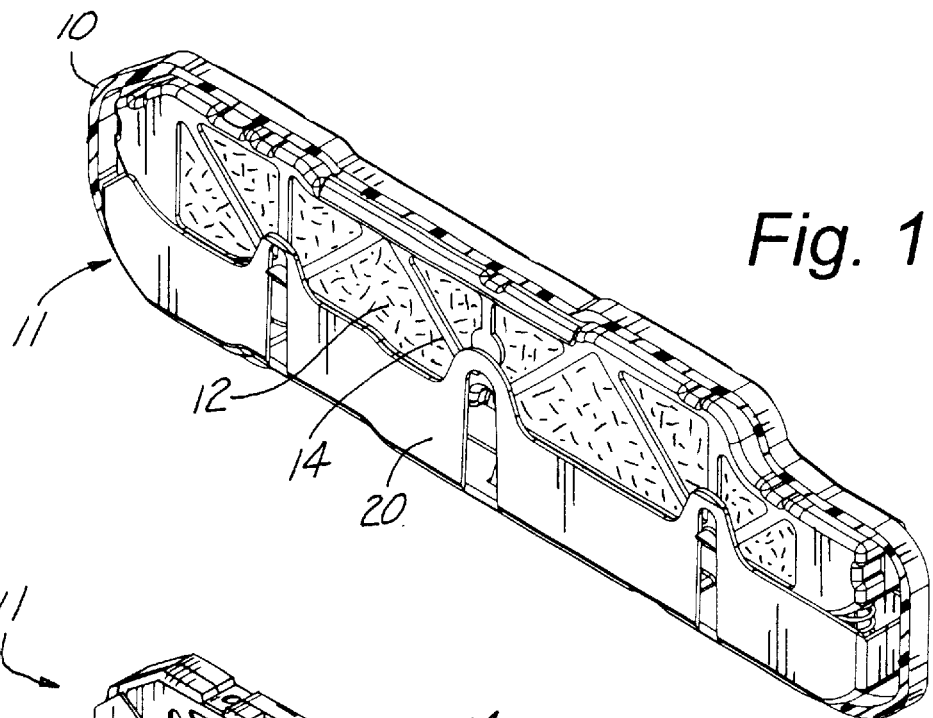
FIG. 1 is a perspective view of a preferred embodiment of the present invention shown inside of a plastic fuel tank with most of the fuel tank cut away to show the structure disposed therein.
Figure 2:
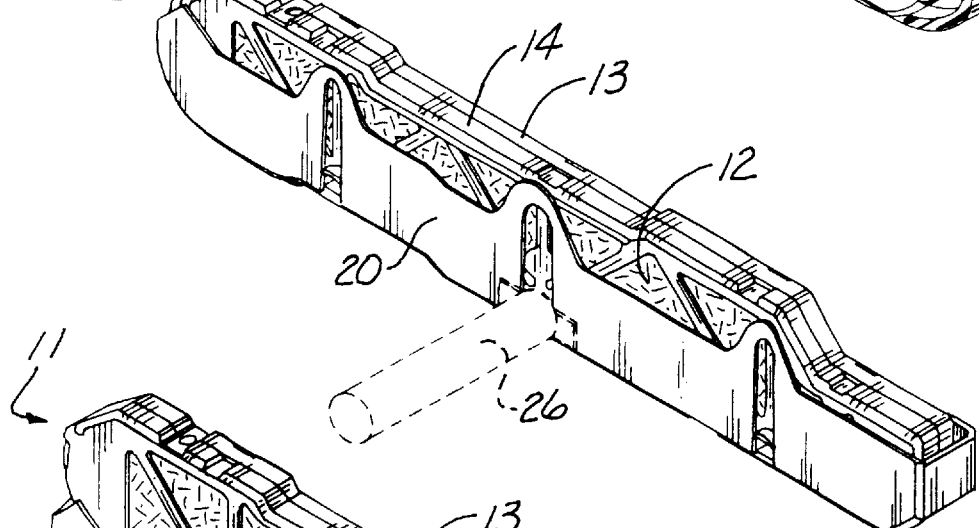
FIG. 2 is a perspective view of the collapsible baffle of the present invention shown in a collapsed condition and with a pin holding it in such a position whereby it can be inserted into an opening in the top of a fuel tank as shown in FIG. 4.
Figure 3:
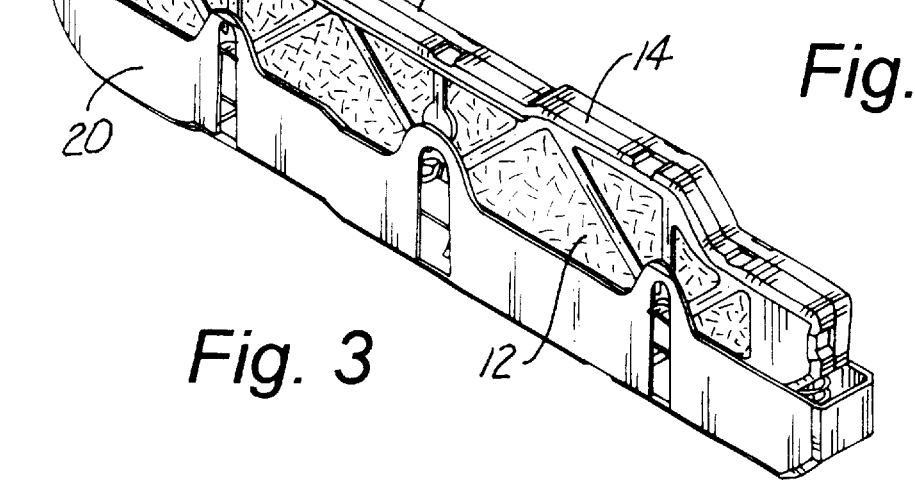
FIG. 3 is a perspective view of the collapsible baffle shown in FIG. 2, but showing the locking pin removed and showing it in its installed condition except that the fuel tank is not shown in FIG. 3 as it is in FIG. 1.

Referring now to the drawings, wherein like reference numerals designate identical or corresponding parts throughout the several views, FIG. 1 shows a cross sectional view of a portion of a plastic fuel tank (10) having the sound abatement filter (11) of the present invention disposed therein. FIGS. 2 and 3 also show the sound abatement filter (11) in a collapsed and expanded position respectively, and the parts thereof are more completely shown in FIG. 10.

Figure 10:
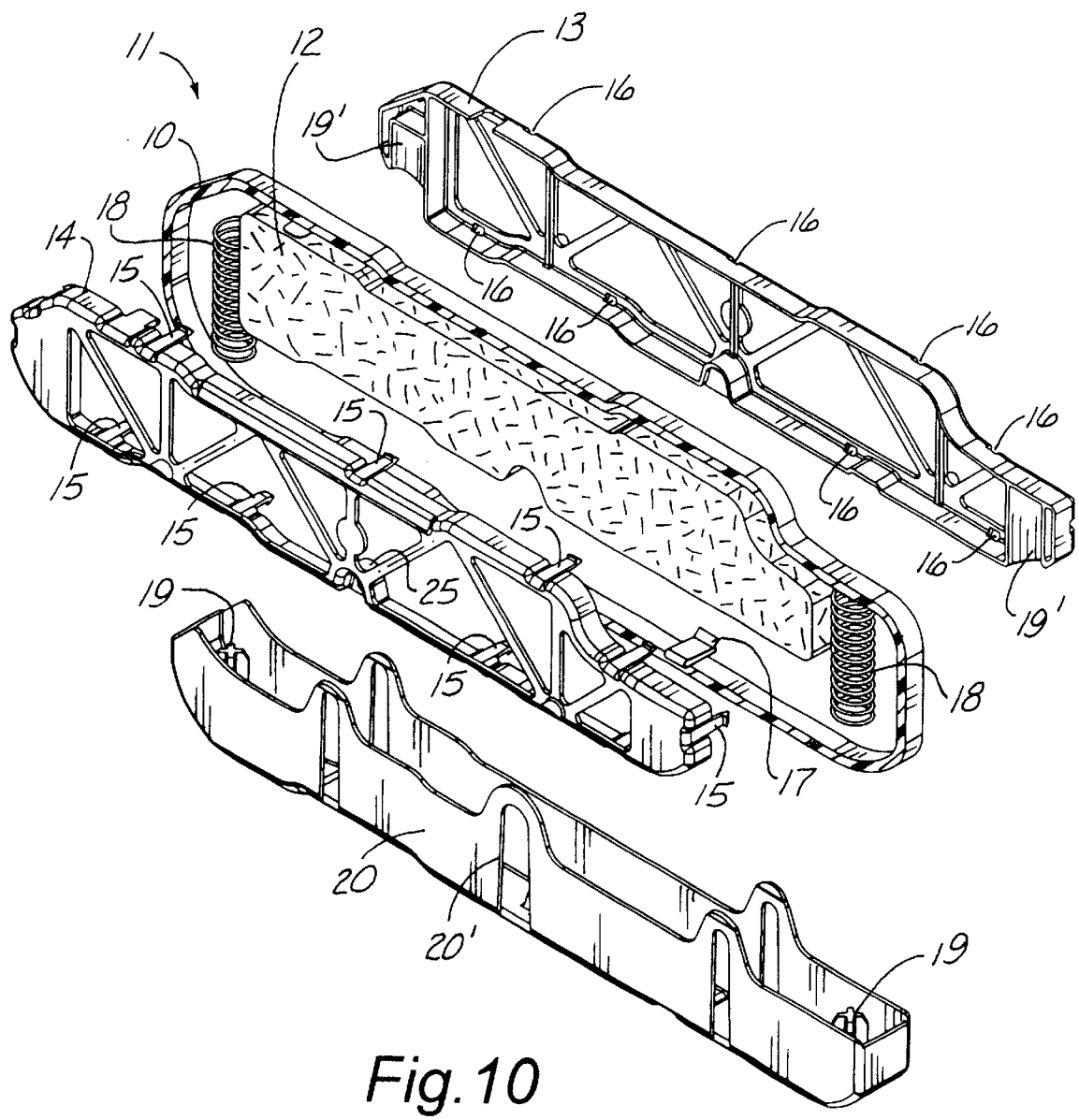
FIG. 10 is an exploded view of the baffle structure of the present invention.

Referring to FIG. 10, a portion of the plastic fuel tank (10) is shown and a filter media (12) constructed in a preferred embodiment of a three-pound micro-light fiberglass media available from Johns Manville. The word "filter" used herein is intended to be in the context of filtering noise, fuel wave action or particulate matter. This material is described as LOI 15%, SPPI G30-99-2980. Of course this invention is not limited to this filter media, but is only the best mode. A cloth covering, such as a polyester cloth, can cover the fiberglass to make it more user friendly. It is known also that polyurethane safety foam of the type shown in the cited prior art literature is a possible substitute for the fiberglass filter media. Since this fiberglass media material (12) is somewhat flexible, it is surrounded by a cage or holder comprised of a first half (13) and a second half (14) which are snapped together by clips (15) on the holder half (14) which extend through openings (16) in the holder half (13) to hold the two halves (13) and (14) together around the filter media (12).

Figure 6:
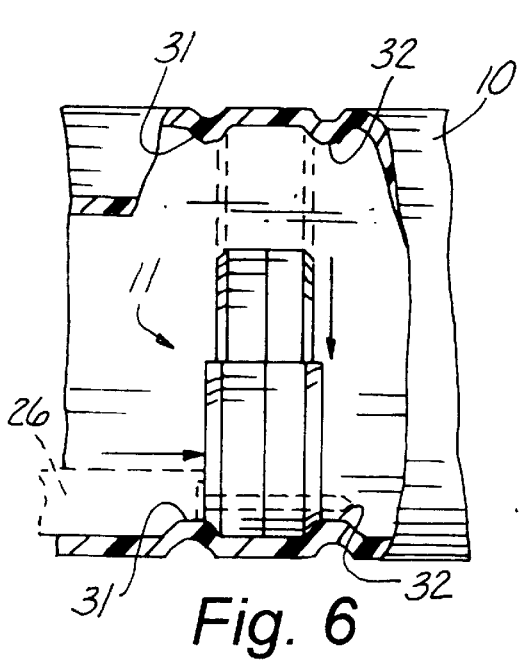
FIG. 6 is an enlarged view similar to FIG. 5 but showing how the collapsible baffle is moved to the position between the opposing pair of flanges and with the pin holding it in the collapsed position.
Figure 6A:
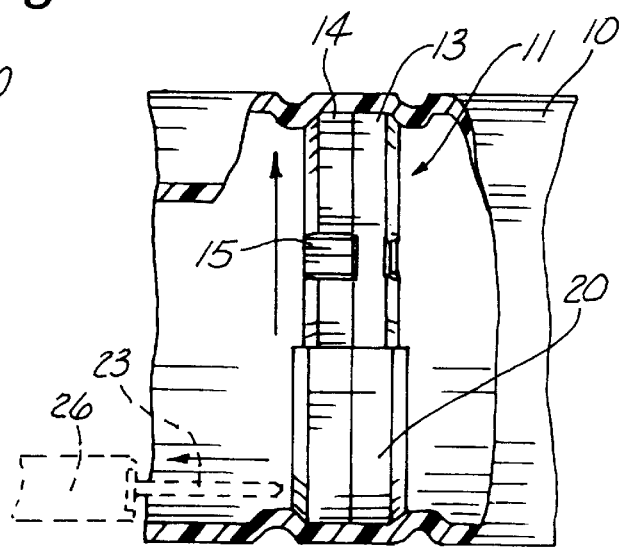
FIG. 6A is a view similar to FIG. 6, but showing how springs within the collapsible baffle cause it to move back to its expanded position as shown in FIG. 3 to thereby be held in place between opposing pairs of flanges within the fuel tank.
Figure 7:
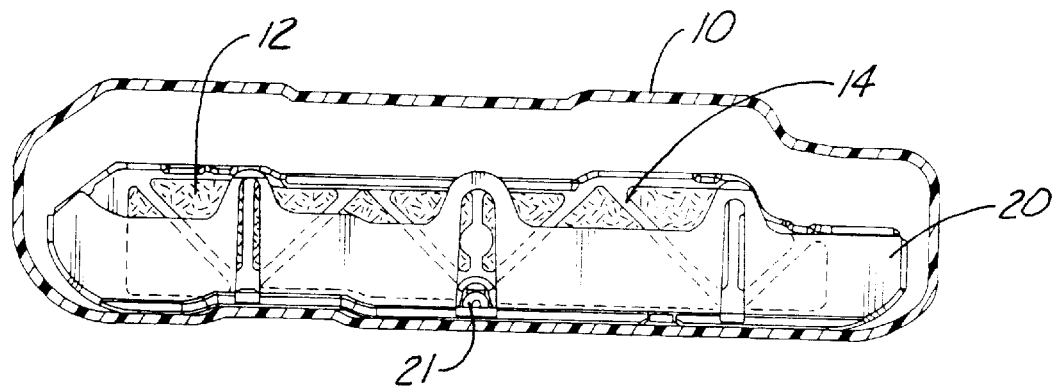
FIG. 7 is a cross sectional view through the fuel tank showing the collapsible baffle in the position shown in FIG. 6.
Figure 8:
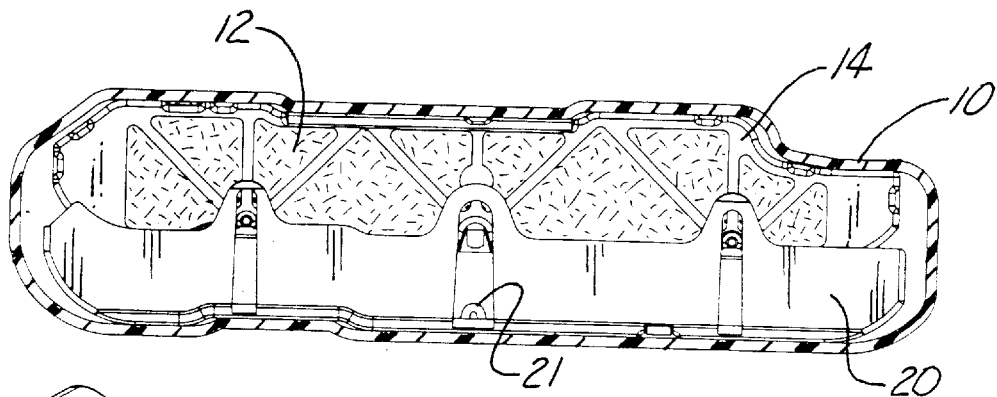
FIG. 8 is a cross sectional view of the fuel tank showing the collapsible baffle in the position of FIG. 6A.
Figure 9:
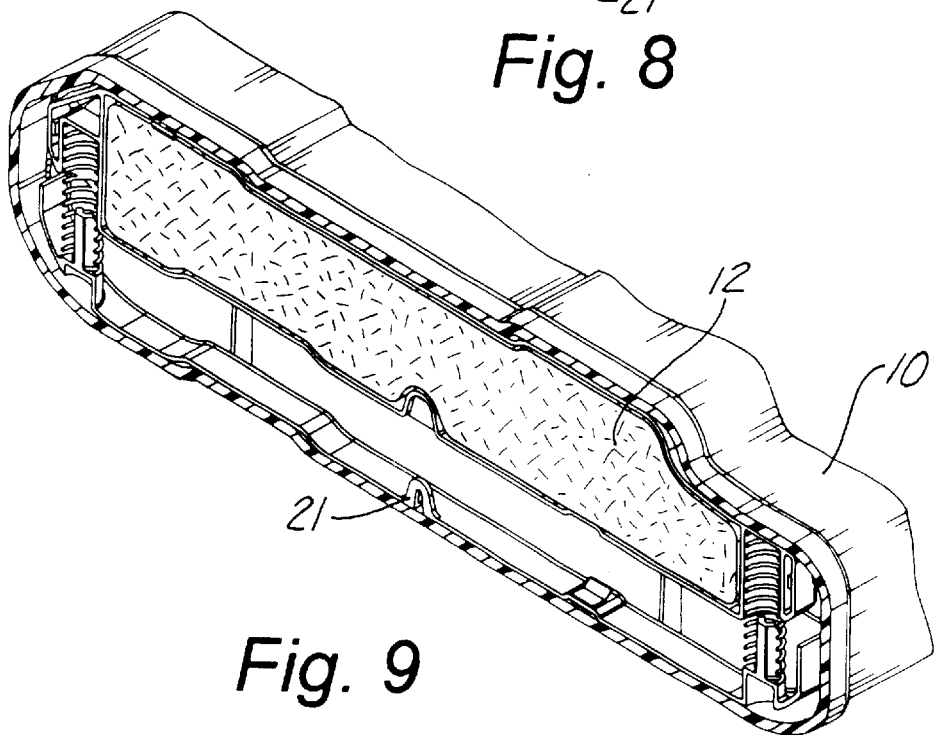
FIG. 9 is a cross sectional view showing the media and biasing springs of the collapsible baffle inside of a fuel tank which is cut away.
Figure 11:
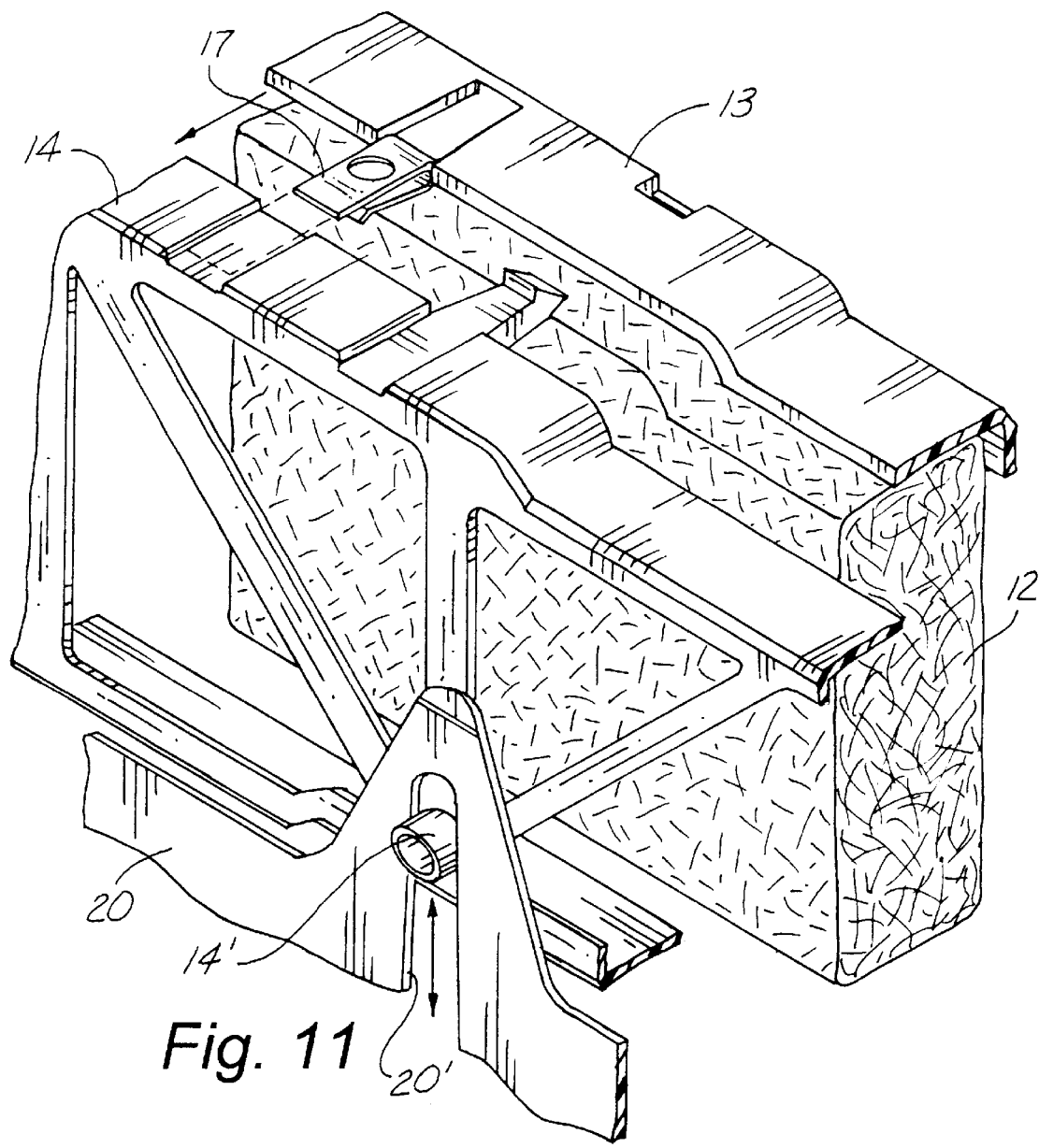
FIG. 11 is an enlarged partial view of the baffle showing its interlocking mechanism.
Figure 12:
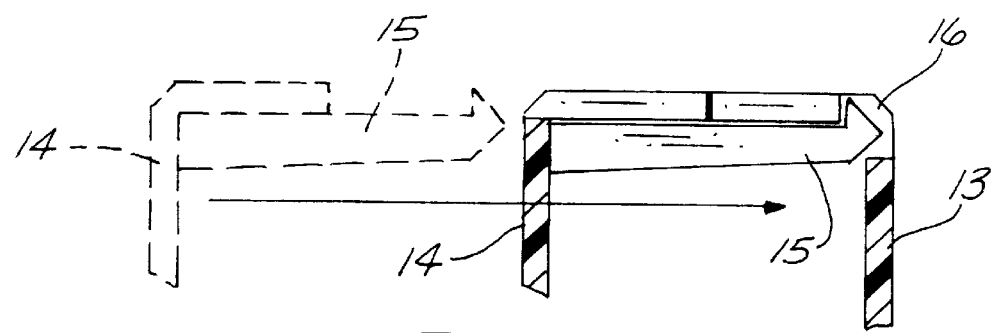
FIG. 12 is an enlarged partial view of the clip mechanism that holds each half of the baffle holder together.

Metal clips (17) clip on to the cage half (14) but these clips (17) are merely to allow a magnetic device (not shown) to sense clips (17) through the plastic fuel tank (10) in order to be certain that the device (11) is in its proper position as shown in FIGS. 6A and 8 with respect to the tank (10). Compression springs (18) fit over projections (19) in the base member (20) and fit in holders (19') in holder half (13) and therefore bias the cage halves (13) and (14) and media (12) to the upper position shown in FIGS. 3, 6A and 8. Guide slots (20') (FIG. 11) in holder (20) receive guide projections (14') on holder half (14).

Figure 13:
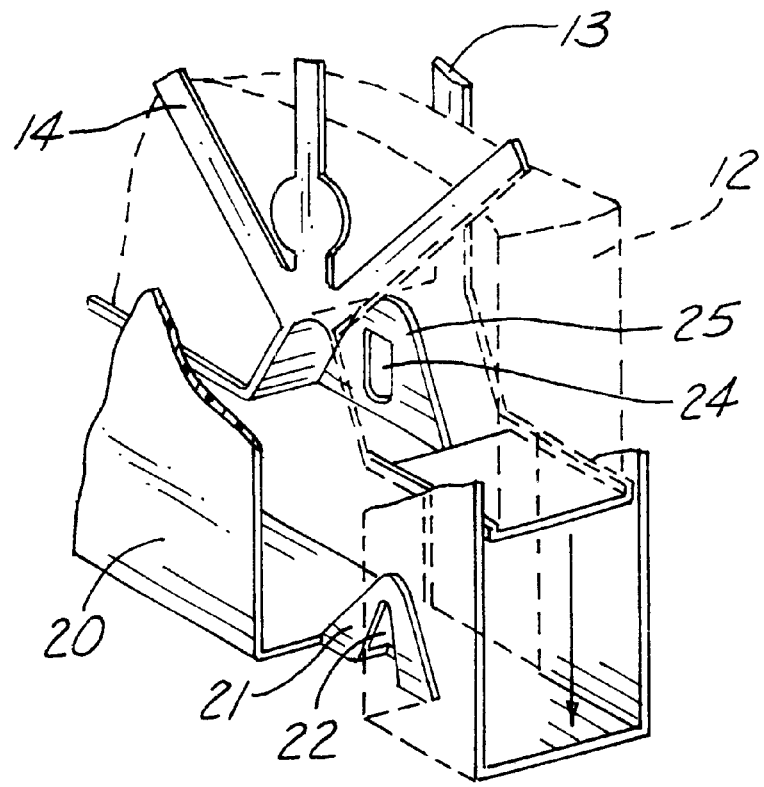
FIG. 13 is an enlarged partial perspective view showing the baffle in an unlocked position.
Figure 14:
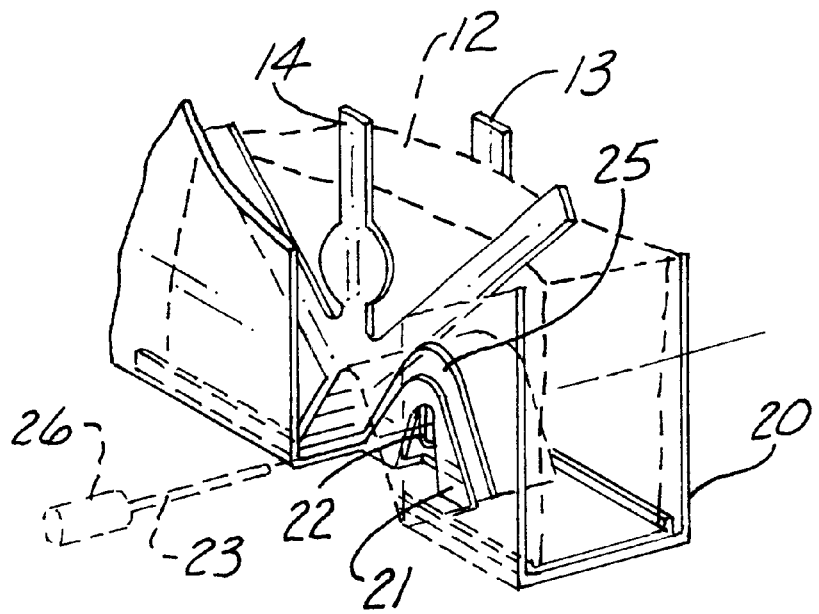
FIG. 14 is a view similar to FIG. 13, but showing the baffle moved to the collapsed position in readiness to have a pin lock it in such position before it is inserted into a fuel tank.

Referring to FIG. 13, the base (20) has a projection (21) therein having an opening (22) for selectively receiving a pin (23) shown in dashed lines in FIG. 14. When the cage (13), (14) and media (12) unit is pushed down to the position shown in FIGS. 2, 6, 7 and 14, the opening (22) is aligned with an opening (24) in tab (25) of cage half (14). In the position shown in FIG. 14, the pin (23) can be manually inserted through the openings (22) and (24) and that will cause the device (11) to remain in the collapsed or second position thereof, the first position being the expanded position shown in FIGS. 3, 6A, 8, and 9. The second position is the collapsed position shown in FIGS. 2, 6, 7 and 14.

Figure 4:
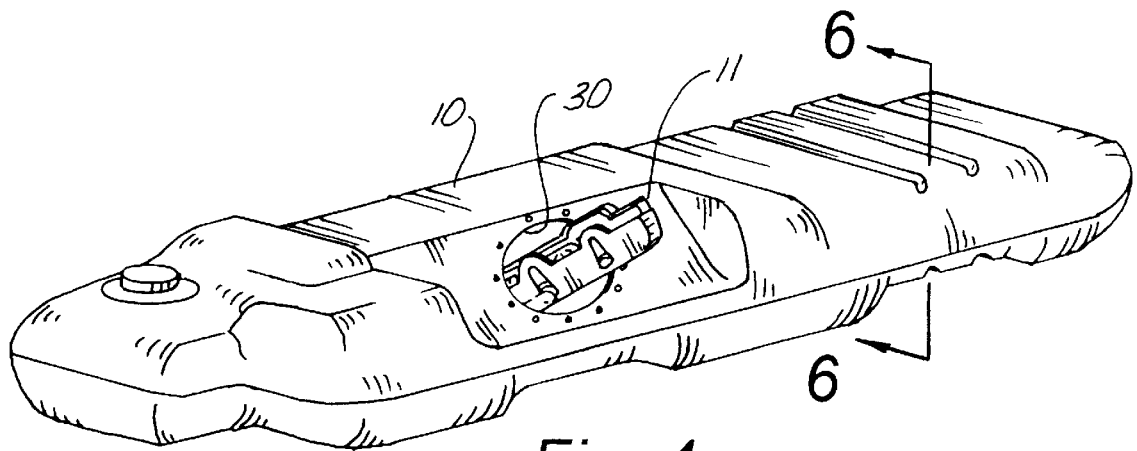
FIG. 4 is a perspective view of a fuel tank of the type utilized for this invention and showing how the collapsible baffle of FIG. 2 is inserted into an opening in the top of the fuel tank.
Figure 5:
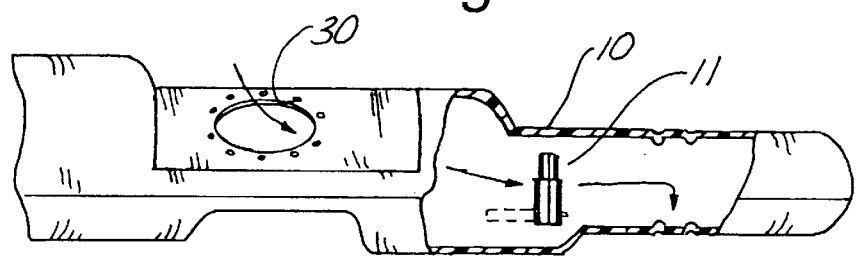
FIG. 5 is a partial cut-away view of the fuel tank showing how the collapsible baffle is moved through the opening and to a position where a pair of opposing flanges inside the tank will hold the baffle in place.

In operation, the sound abatement filter (11) as shown in FIG. 3 would be moved to the collapsed or second position as shown in FIG. 2 and the pin (23) (FIG. 14) is inserted to keep the cage halves (13) and (14) and media (12) in the collapsed position as shown in FIG. 2, whereupon the device (11) is inserted through an enlarged opening (30) in tank (10) as shown in FIG. 4. The opening (30) is large enough for a person's arm to extend therethrough and the device (11) with the pin (23) still holding it in the collapsed position, the device (11) is moved first to the position shown in FIG. 5 and then to the position shown in FIG. 6 between opposing flanges (31) and (32) on each side of the unit (11). Then the handle (26) of the pin (23) is pulled to the left as shown in FIG. 6A and the springs (18) shown in FIGS. 9 and 10 will cause the cage portion (13) and (14) to move to the position shown in FIG. 6A and lock the sound abatement filter (11) in place within the tank (10). If it is desired to remove the baffle (11), a reverse procedure would be employed.

It has been determined that the preferred embodiment disclosed herein does not reflect the sound wave of moving fuel but absorbs the energy of the wave of fuel to dissipate the sound of the moving fuel much like the way acoustical materials absorb sound energy.

Accordingly it will be appreciated that the preferred embodiment shown in FIGS. 1–14 does indeed accomplish the aforementioned objects. Obviously many modifications and variations of the present invention are possible in light of the above teachings. It is therefore to be understood that, within the scope of the appended claims, the invention may be practiced otherwise than as specifically described.

We claim:

1. Apparatus comprising:
    a fuel tank having a top, bottom, a first side, a second side, a first end and a second end and having an opening in the top thereof;
    a sound absorbing baffle having a length, a width and a height and being constructed of a material to allow liquid fuel to flow there through; and
    means associated with said baffle for permitting the height of said baffle to be temporarily reduced so that said baffle will pass through said opening in the top of the tank and allow said baffle to substantially extend from the top to the bottom of said tank once it is in the tank.

2. The apparatus of claim 1 wherein said baffle comprises:
    a bottom holder;
    a top holder, said top holder having a first position and a second position with respect to said bottom holder;
    a media disposed in at least one of said top and bottom holders for absorbing sound and fuel wave motion and permitting fuel to pass there through; and
    said means associated with said baffle for permitting the height of said baffle to be temporarily reduced including biasing means for biasing said top holder to said first position whereby said baffle will extend substantially from the top to the bottom of said tank and permitting said top holder to move to the second position thereof whereby said baffle height is reduced enough to allow the baffle to pass through said opening in the top of the tank.

3. The apparatus of claim 2 including means for temporarily locking said top holder to said second position thereof whereby it can be locked in said second position thereof while inserting said baffle into said fuel tank and permitting said top portion to be unlocked after it is placed in a predetermined position within said fuel tank.

4. The apparatus of claim 3 wherein said locking means includes a first hole in a portion of said top holder, a second hole in a portion of said bottom holder and a pin for selectively extending into said first and second holes when said top portion is in the second position thereof.

5. The apparatus of claim 2 wherein said top holder is a cage having openings to permit fuel to more easily flow through said sound absorbing baffle.

6. The apparatus of claim 2 wherein said media comprises fiberglass.

7. The apparatus of claim 2 wherein said media comprises a semi-rigid plastic foam material.

8. The apparatus of claim 7 wherein said plastic foam material comprises polyurethane.

9. The apparatus of claim 1 wherein a metal component is provided in said baffle for allowing the position of said baffle within said tank to be determined with a metal sensing device.

10. The apparatus of claim 2 wherein a cloth cover is disposed on said media.

11. Apparatus comprising:

a fuel tank having a top, bottom, a first side, a second side, a first end and a second end and having an opening in the top thereof;

a sound absorbing baffle having a length, a width and a height and being constructed of a material to allow liquid fuel to flow there through; and, said baffle having a reduced height for permitting the baffle to be temporarily reduced so that said baffle will pass through said opening in the top of the tank and an expanded height to allow said baffle to substantially extend from the top to the bottom of said tank once it is in the tank.

* * * * *